(12) United States Patent
Jain et al.

(10) Patent No.: US 9,298,243 B2
(45) Date of Patent: Mar. 29, 2016

(54) SELECTION OF AN OPERATING POINT OF A MEMORY PHYSICAL LAYER INTERFACE AND A MEMORY CONTROLLER BASED ON MEMORY BANDWIDTH UTILIZATION

(71) Applicant: Advanced Micro Devices, Inc., Sunnyvale, CA (US)

(72) Inventors: Ashish Jain, Austin, TX (US); Alexander J. Branover, Chestnut Hill, MA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 312 days.

(21) Appl. No.: 13/932,682

(22) Filed: Jul. 1, 2013

(65) Prior Publication Data

US 2015/0006924 A1 Jan. 1, 2015

(51) Int. Cl.
*G06F 1/32* (2006.01)
*G06F 3/06* (2006.01)

(52) U.S. Cl.
CPC ............ *G06F 1/3203* (2013.01); *G06F 1/3275* (2013.01); *G06F 1/3225* (2013.01); *G06F 3/0625* (2013.01)

(58) Field of Classification Search
CPC ...... G06F 1/3225; G06F 1/324; G06F 1/3275; G06F 3/0625
See application file for complete search history.

(56) References Cited

U.S. PATENT DOCUMENTS

| | | | |
|---|---|---|---|
| 2010/0042996 A1* | 2/2010 | Corry et al. | 718/100 |
| 2011/0320839 A1* | 12/2011 | David et al. | 713/322 |
| 2011/0320846 A1* | 12/2011 | David et al. | 713/340 |
| 2012/0159230 A1* | 6/2012 | Chen | 713/600 |

* cited by examiner

*Primary Examiner* — Albert Wang

(57) ABSTRACT

The present application describes embodiments of a method that includes modifying an operating point of at least one of a memory physical layer interface or a memory controller in response to changes in bandwidth utilization of the memory physical layer interface. The present application also describes embodiments of an apparatus that includes a memory controller, a memory physical layer interface, and a power management controller to modify an operating point of at least one of the memory physical layer interface or the memory controller in response to changes in bandwidth utilization of the memory physical layer interface.

20 Claims, 5 Drawing Sheets

SELECTION OF AN OPERATING POINT OF A MEMORY PHYSICAL LAYER INTERFACE AND A MEMORY CONTROLLER BASED ON MEMORY BANDWIDTH UTILIZATION

BACKGROUND

1. Field of the Disclosure

This application relates generally to processing systems, and, more particularly, to operating points of a memory physical layer interface and a memory controller in a processing system.

2. Description of the Related Art

Processing systems such as a system-on-a-chip (SOC) use memory to store data or instructions for later use. For example, processing devices such as central processing units (CPUs), graphics processing units (GPUs), and accelerated processing units (APUs) can read instructions or data from memory, perform operations using the instructions or data, and then write the results back into the memory. Processing systems may include a memory physical layer interface for controlling access to a memory module such as dynamic random access memory (DRAM) that can be used to store information so that the stored information can be accessed by the processing devices during operation of the processing system. The memory physical layer interface in the APU is conventionally referred to as a "memory phy." A memory controller is typically used to control operation of the memory physical layer interface.

The memory physical layer interface operates at a selected frequency and voltage, which may be referred to as the operating point of the memory physical layer interface. For example, the memory physical layer interface typically requires a relatively higher voltage to operate at a relatively higher frequency. The memory controller may therefore also be configured to operate at the operating point of the memory physical layer interface. Thus, setting the operating point of the memory physical layer interface may also include setting the operating point of the corresponding memory controller. The processing device can set the operating point of the memory physical layer interface and the memory controller to different predetermined combinations of frequency and voltage that may be referred to as performance states (or P-states) of the memory physical layer interface or the memory controller. For example, the memory physical layer interface may be able to operate at a first operating point that corresponds to relatively low frequency/voltage and a second operating point that corresponds to relatively high frequency/voltage. The first operating point is a low performance state because of the relatively low frequency and the second operating point is a high performance state because of the relatively high frequency.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

Figure 1:
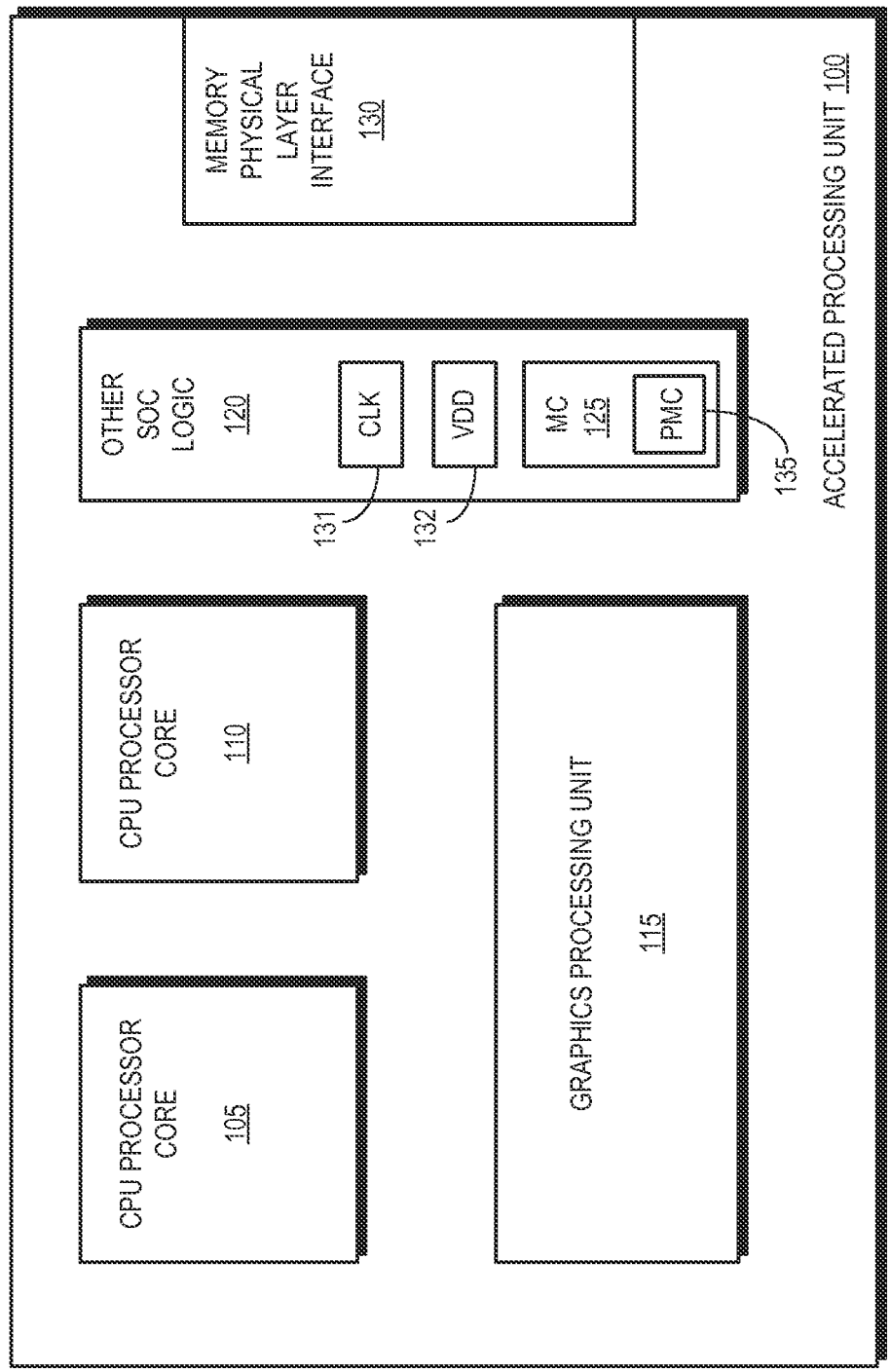
FIG. 1 is a block diagram of an accelerated processing unit (APU) that includes one or more central processing unit (CPU) processor cores and a graphics processing unit in accordance with some embodiments.

Conventional processing systems such as APUs correlate the operating points of the memory physical layer interface with operating points of memory clients such as central processing units (CPUs) or graphics processing units (GPUs) in the system. For example, a conventional processing system may choose an operating point of the memory physical layer interface by assuming that a higher CPU or GPU operating point demands higher memory performance and therefore a higher operating point for the memory physical layer interface. Thus, the operating point of the memory controller and the memory physical layer interface typically increases (e.g., moves from a lower-performance voltage/frequency combination to a higher-performance voltage/frequency combination) when the CPU/GPU operating point increases and decreases (e.g., moves from a higher performance voltage/frequency combination to a lower-performance voltage/frequency combination) when the CPU/CPU operating point decreases.

However, the assumed correlation between the operating point of the memory controller/phy and the CPU or GPU operating point does not always hold. For example, in some compute-intensive scenarios the operating point of the memory controller/phy may not need to be increased in response to an increase in the operating point of the CPU or GPU to maintain the overall performance of the system. In such cases, choosing the operating point of the memory controller/phy based on the assumed correlation can result in wasted power or lost CPU or CPU performance in the cases when it does not hold true. For example, if a high CPU operating point does not require higher memory performance, increasing the operating point of the memory controller/phy can unnecessarily increase the leakage current and idle power consumption of the memory physical layer interface, thereby wasting power. For another example, the overall power budget of the processing system is limited and unnecessarily setting the operating point of the memory physical layer interface to a higher frequency/voltage may deprive the CPU or GPU of power that could be used to increase the performance of the CPU or GPU.

FIGS. 1-4 depict embodiments of a system-on-a-chip (SOC) that can choose the operating point of a memory physical layer interface based on a bandwidth used by the memory physical layer interface for transactions involving a memory that is coupled to the memory physical layer interface. As discussed herein, setting the operating point of the memory physical layer interface may entail setting the operating point of the corresponding memory controller. In the interest of clarity, the present application describes embodiments of techniques for setting the operating point of the memory physical layer interface with the understanding that a corresponding adjustment in the operating point of the memory controller may also be performed. Some embodiments may set the operating point of the memory physical layer interface based on an average of the bandwidth utilization over several measurement periods. The operating point of the memory physical layer interface can then be decreased in response to decreases in the average of the bandwidth or increased in response to increases in the average of the bandwidth. For example, the operating frequency and/or operating voltage used by the memory physical layer interface may be reduced when the average of the bandwidth falls below a first threshold value. The operating point may be increased (e.g., by increasing the operating frequency and/or the operating voltage of the memory physical layer interface) when the average of the bandwidth rises above a second threshold value, which may be different than the first threshold value to introduce a hysteresis.

Adjusting the operating point of the memory physical layer interface based on the memory transaction bandwidth may lead to lower power consumption and/or improved CPU/GPU performance. For example, if an increase in the CPU operating point does not require additional memory bandwidth, the operating point of the memory physical layer interface can remain in a low performance state, thereby reducing the power consumption of the memory physical layer interface relative to the conventional practice of increasing both the memory and CPU operating points in lockstep. For another example, the power conserved by keeping the memory physical layer interface in the low performance state can be directed to the CPU to increase its operating point and increase the performance of the CPU.

FIG. 1 is a block diagram of an accelerated processing unit (APU) 100 that includes one or more central processing unit (CPU) processor cores 105, 110 and a graphics processing unit (GPU) 115 in accordance with some embodiments. The CPU processor cores 105, 110 can execute instructions independently, concurrently, or in parallel. Although the APU 100 shown in FIG. 1 includes two CPU processor cores 105, 110, persons of ordinary skill in the art having benefit of the present disclosure should appreciate that the number of processor cores in the APU 100 is a matter of design choice. Some embodiments of the APU 100 may include more or fewer than the two CPU processor cores 105, 110 shown in FIG. 1. The CPU 120 is used for creating visual images intended for output to a display. Some embodiments of the GPU 120 may also include multiple processing cores (not shown).

The processing system 100 shown in FIG. 1 also includes other SOC logic 120. Some embodiments of the other SOC logic 120 may include a DMA engine (not shown) for generating addresses and initiating memory read or write cycles, for performing memory-to-memory data transfer, or for transferring data between the CPU processor cores 105 or the GPU 115. The other SOC logic 120 may also include routing logic, coherency logic, or logic to implement other functionality. Some embodiments of the other SOC logic 120 include a memory controller (MC) 125 to coordinate the flow of data between the APU 100 and other memory such as an external DRAM (not shown in FIG. 1). The memory controller 125 includes logic used to control reading information from the external memory and writing information to the external memory. The memory controller 125 may also include refresh logic that is used to periodically re-write information to the DRAM so that information in the memory cells of the DRAM is retained. Some embodiments of the DRAM may be double data rate (DDR) DRAM, in which case the memory controller 125 may be capable of transferring data to and from the DRAM on both the rising and falling edges of a memory clock.

The memory controller 125 may control the operation of other memory modules using signals transmitted via a memory physical layer interface 130, which may be referred to as a memory phy. The memory physical layer interface 130 includes the circuitry used to drive signals that govern operation of the other memory modules that may be coupled to the APU 100. For example, the memory physical layer interface 130 may provide signals that control reading, writing, refreshing, or erasing portions of a memory module such as a DRAM. The memory physical layer interface 130 may be able to operate at different operating points, which may be determined by an operating frequency and/or operating voltage of the memory physical layer interface 130. For example, the other SOC logic 120 may include a clock 131 provides a clock signal to govern synchronization in the memory physical layer interface 130 and/or the memory controller 125 and a reference voltage (VDD) 132 that governs the voltage used by the memory physical layer interface 130 and/or the memory controller 125. The clock frequency and the reference voltage used by the memory physical layer interface 130 and/or the memory controller 125 can be modified, as discussed herein. The APU 100 therefore supports power management for controlling the operating point of the memory physical layer interface 130.

Some embodiments of the processing system 100 include a power management controller (PMC) 135 that is implemented as part of the other SOC logic 120. The power management controller 135 may be used to set the operating frequency and/or operating voltage of the memory physical layer interface 130 based on bandwidth utilization of the memory physical layer interface 130. For example, the power management controller 135 may control the clock frequency output by the clock 131 or the reference voltage 132. However, persons of ordinary skill in the art having benefit of the present disclosure should appreciate that embodiments of the APU 100 may implement power management control in other locations or may implement distributed power management control using logic included in multiple locations such as the CPU processor cores 105, 110, the other SOC logic 120, or the GPU 115. The PMC 135 can monitor the memory bandwidth utilization, e.g. by monitoring a number of read/write instructions processed by the memory physical layer interface 130, a number of blocks read or written via the memory physical layer interface 130, or other measures of the bandwidth used by the memory physical layer interface 130 to support operation of the memory. Other measures of the bandwidth utilization may be provided by software, firmware, or hardware in some embodiments of the processing system 100. For example, software, firmware, or hardware may supply information indicating a number of requests for pages in the memory handled by the memory physical layer interface 130 or a number of requests for banks in the memory handled by the memory physical layer interface 130.

The PMC 135 may choose the operating point of the memory physical layer interface 130 based on the bandwidth utilization, e.g., by setting the operating point of the memory physical layer interface 130 based on an average of the bandwidth utilization over several measurement periods. For example, the PMC 135 can use measurements of the bandwidth utilization such as a ratio of a number of cycles of the clock 131 that the memory controller 125 is busy performing read, write, or other operations to a total number of clock cycles, a number of memory transactions involving the memory physical layer interface 130 in a given time interval, number of clock cycles, or other measure. The PMC 135 may then choose the operating frequency/voltage for the memory physical layer interface 130 based on the average of the measurements. In some embodiments, the average of the measurements may be a moving average of the measurements.

Modifying the operating point of the memory physical layer interface 130 in response to changes in the memory bandwidth utilization can reduce the power consumption of the memory physical layer interface 130. The resulting power savings can then be used to reduce the overall power consumption of the APU 100 and/or to increase the performance of the CPU processor cores 105, 110 or the graphics processing unit 115 by directing additional power to one or more of these elements. For example, the thermal design power (TDP) allocated to support operation of the APU 100 may be approximately 25 W, of which six watts may be budgeted to each of the CPU processor cores 105, 110, six watts may be budgeted to the GPU 120, four watts may be budgeted to the memory physical layer interface 130, and three watts may be budgeted to the other SOC logic 120. The compute units in the AU 100 may then be configured to operate within the budgeted power envelope. For example, an operating frequency or operating voltage of the CPU processor core 105 may be configured so that the CPU processor cores 105 consumes less than six watts during normal operation. However, in some circumstances the power consumed by one or more of the compute units may exceed the budgeted amount, e.g., if the compute unit is processing an unexpectedly large number of operations or instructions for an unexpectedly long time.

Some embodiments of the memory physical layer interface 130 can operate in two memory performance states: a high performance state and a low performance state. For example, in the high performance state, the physical layer interface 130 may operate at a frequency of 800 MHz and an operating voltage of 1.05 V and in the low performance state, the physical layer interface 130 may operate at a frequency of 400 MHz and an operating voltage of 0.95 V. In this example, the high performance state consumes two watts of idle and leakage power and the low performance state consumes one watt of idle and leakage power. Switching the operating point of the memory physical layer interface 130 from the high performance state to the low performance state in response to a decrease in the bandwidth utilization of the memory physical layer interface 130 may therefore free up to one watt of power. The PMC 135 may then allow one or more of the compute units 105, 110, 115 to consume the additional watt by operating at a higher frequency and/or voltage to increase performance.

Figure 2:
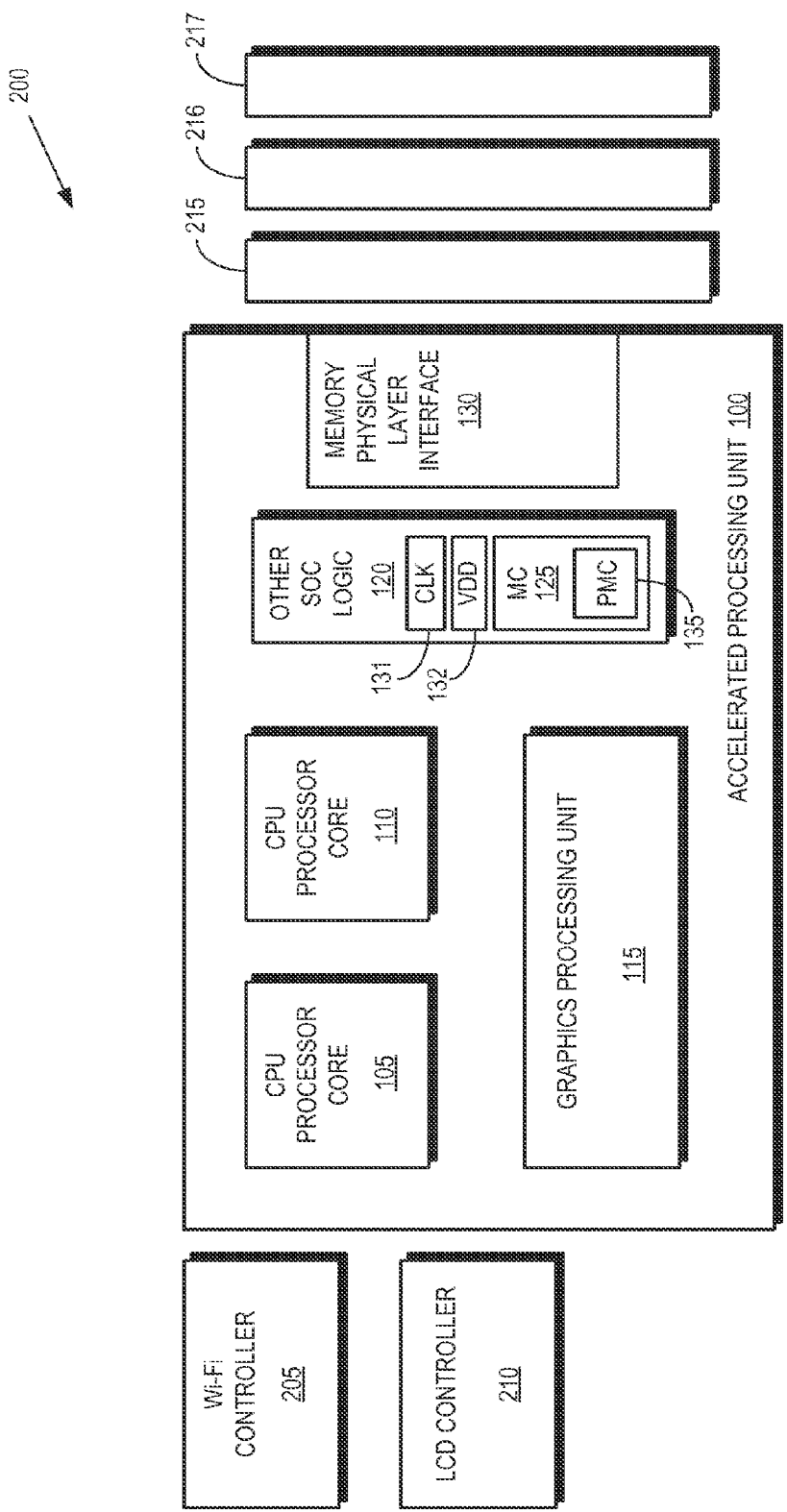
FIG. 2 is a block diagram of a processing device that includes an accelerated processing unit (APU) such as the APU 100 shown in FIG. 1 in accordance with some embodiments.

FIG. 2 Is a block diagram of a processing device 200 that includes an APU 100 such as the APU 100 shown in FIG. 1 in accordance with some embodiments. Some embodiments of the APU 100 include one or more CPU processor cores 105, 110 a GPU 115, other SOC logic 120, and a physical layer interface 130 that may operate in the same manner as the corresponding elements in FIG. 1. Some embodiments of the processing device 200 include a controller for wireless interfaces supported by the processing device 200 such as a Wi-Fi controller 205 and a LCD controller 210 for an LCD display. Some embodiments of the processing device 200 may also include controllers for LED displays, touchscreens, and the like. The processing device 200 also includes one or more memory modules 215-217 that may include memory such as DRAM. For example, each of the memory modules 215-217 may include an 8 GB DRAM memory card that may be coupled to the processing device 200 using a corresponding socket.

As discussed herein with regard to FIG. 1, the power management controller 135 in the processing device 200 may be able to modify an operating frequency and/or an operating voltage of the memory physical layer interface 130 in response to changes in the bandwidth utilization of one or more of the memory physical layer interface 130. The memory physical layer interface 130 and the memory modules 215-217 should operate at the same frequency and so the memory modules 215-217 may adapt their operating frequency to match the modified operating frequency of the memory physical layer interface 130. The power consumption of the memory modules 215-217 may therefore be reduced when the bandwidth utilization falls. For example, the total die power (TDP) budget of the processing device 200 may be approximately 55 W, of which 25 W may be allocated to the APU 100, eight watts may be allocated to be memory modules 215-217, twelve watts may be allocated to the display controller 210, and ten watts may be allocated to the other components such as the Wi-Fi controller 205. If the memory modules 215-217 consume two watts of leakage power when operating at the higher frequency (e.g., 800 MHz) and consume one watt of leakage power when operating at the lower frequency (e.g. 400 MHz), switching the operating point of the memory physical layer interface 130 from the high performance state to the low performance state in response to a decrease in the bandwidth utilization of the memory modules 215-217 may therefore free an additional watt of power budget so that the APU 100 can consume the additional watt of power and operate at a higher operating point.

Figure 3:
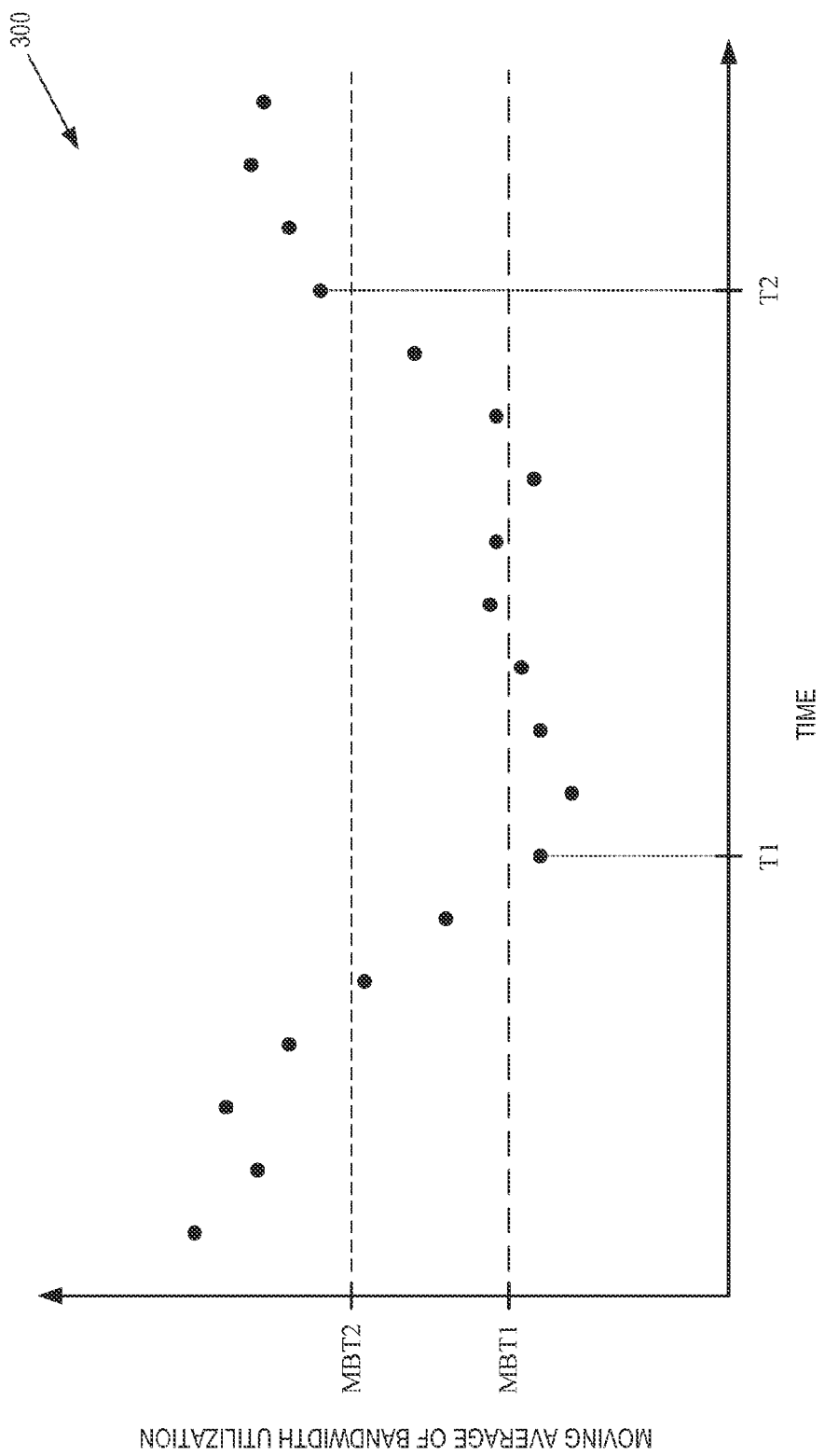
FIG. 3 is a plot of the moving average of the bandwidth utilization of a memory physical layer interface such as the memory physical layer interface shown in FIG. 1 as a function of time in accordance with some embodiments.

FIG. 3 is a plot 300 of a moving average of the bandwidth utilization of a memory physical layer interface as a function of time in accordance with some embodiments. The plot 300 of the moving average illustrated in FIG. 3 may represent the bandwidth utilization for a physical layer interface such as the memory physical layer interface 130 shown in FIG. 1. The horizontal axis indicates time and increases from left to right. The vertical axis indicates the moving average of bandwidth utilization and increases from bottom to top. In some embodiments, the memory bandwidth utilization can be represented by a ratio of a number of clock cycles during which a memory controller associated with the memory is busy with a memory transaction to the total number of clock cycles. The memory bandwidth utilization may also be represented by the number of memory transactions within a given time interval or using other indications of the memory utilization. The moving average of the bandwidth utilization ($BU_{avg,i}$) may then be calculated using:

$$BU_{avg,i} = \alpha \cdot BU_i + (1-\alpha) \cdot BU_{avg,i-1}, \quad (1)$$

where $\alpha$ is the time constant for the moving average, $BU_i$ is the bandwidth utilization during the current measurement interval, and $BU_{avg,i-1}$ is the previously calculated moving average of the bandwidth utilization.

Values of the moving average of the bandwidth utilization shown in plot 300 may be used to modify the operating point of a physical layer interface to the memory. For example, the moving average of the bandwidth utilization falls below a first threshold (MBT1) at the time T1 and the operating point of the memory physical layer interface may be reduced in response to the moving average falling below the first threshold. For another example, the operating point of the memory physical layer interface may be increased in response to the moving average rising above a second threshold (MBT2) at the time T2. Some embodiments may use a first threshold that is lower than a second threshold to provide a hysteresis in the adjustments of the operating point. For example, some values of the moving average rise above the first threshold MBT1 in the time interval between T1 and T2. However, the operating point of the memory physical layer interface may not be increased because these values are not higher than the second threshold MBT2. Persons of ordinary skill in the art having benefit of the present disclosure should also appreciate that additional thresholds may be used, e.g., for physical layer interfaces that have more than two possible operating points.

Some embodiments of processing devices such as the APU 100 shown in FIG. 1 may be configured to operate based on a power usage policy that may be modified by the user or a power usage mode in which the processing device is currently operating. Power usage modes may include an alternating current (AC) mode that can be used when the processing device is attached to an external AC power source such as household AC current. For example, the APU 100 shown in FIG. 1 may be part of a desktop computer or laptop computer that may be plugged into a wall socket. The power usage modes may also include a direct current (DC) mode that can be used when the processing device is operating on battery power. For example, the APU 100 shown in FIG. 1 may be part of laptop computer that may run on battery power when it is not plugged into a wall socket.

The first threshold MBT1 and/or the second threshold MBT2 may be set based upon an operating mode of the processing device that implements the memory physical layer interface. Some embodiments of the processing device may be able to set the first threshold MBT1 or the second threshold MBT2 based on a power usage policy or a power usage mode in which the processing device is currently operating. For example, the first threshold MBT1 and/or the second threshold MBT2 may be set to a relatively high value to conserve power during a direct current (DC) power usage mode. In some embodiments, information or measurements supplied by software or firmware implemented in the processing device can also be used to make upfront decisions about the operating point of the memory physical layer interface. For example, software or firmware may supply information indicating a number of open pages that are currently being accessed in the memory coupled to the memory physical layer interface, which may serve as a preemptive notification to maximize the available memory bandwidth, e.g., by decreasing the first threshold MBT1 or the second threshold MBT2 so that the memory physical layer interface remains in a high performance mode unless the moving average of the bandwidth utilization falls to an extremely low value.

Figure 4:
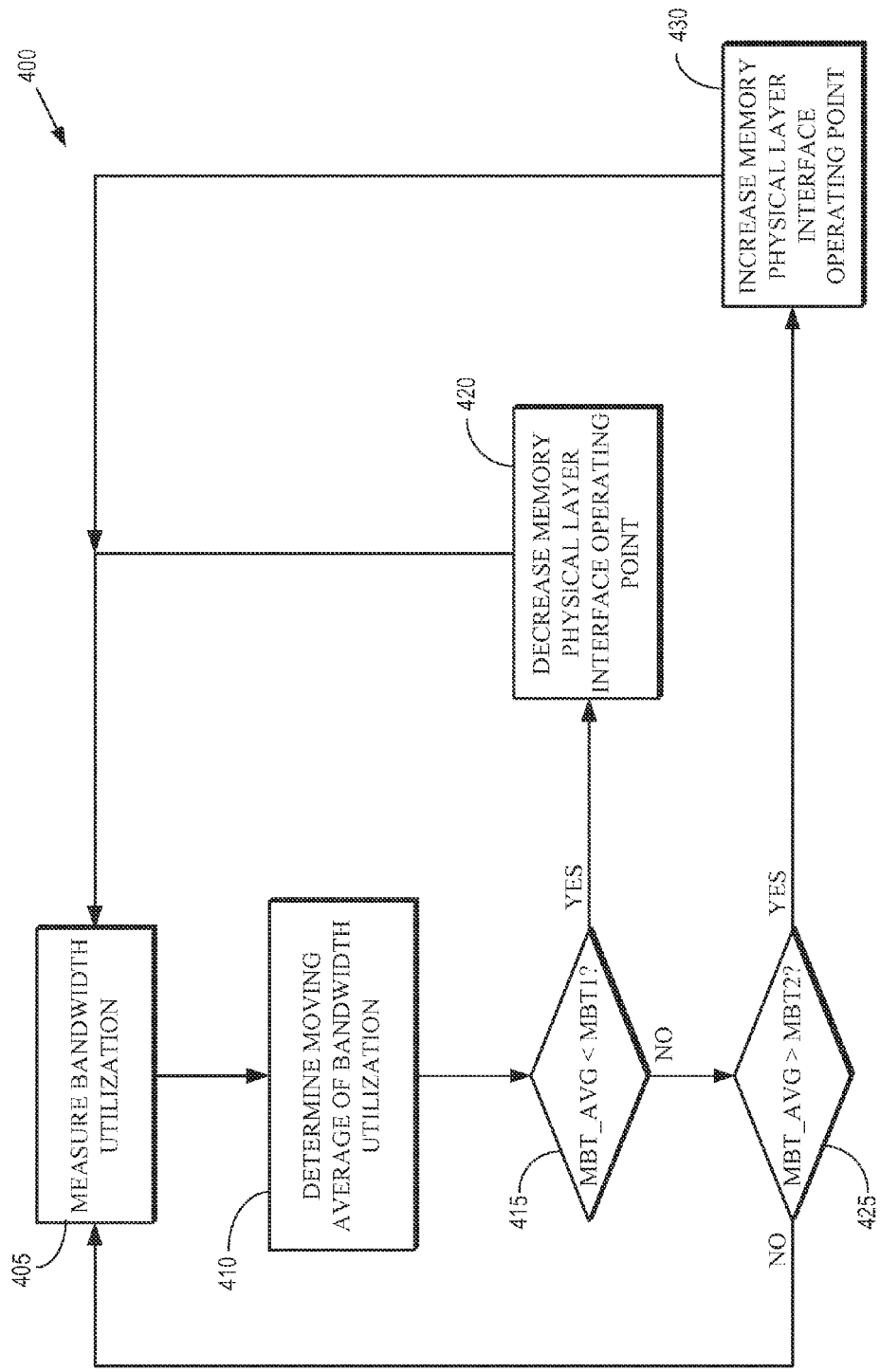
FIG. 4 is a flow diagram of a method for modifying the operating point of a physical layer interface such as the memory physical layer interface shown in FIG. 1 or FIG. 2 in accordance with some embodiments.

FIG. 4 is a flow diagram of a method 400 for modifying the operating point of a physical layer interface such as the memory physical layer interface 130 shown in FIG. 1 or FIG. 2 in accordance with some embodiments. At block 405, bandwidth utilization of the memory may be measured, e.g., by measuring a ratio of a number of clock cycles used for memory access to a total number of clock cycles. For example, the measured value of the bandwidth utilization may be used to determine $BU_i$ in equation (1). At block 410, the current value of the moving average of the memory bandwidth utilization can be determined. For example, the measured value of the bandwidth utilization ($BU_i$) may be used in combination with the previously calculated value of the moving average bandwidth utilization ($BU_{avg,i-}$) to determine the current value of the moving average of the memory bandwidth utilization using equation (1). Some embodiments may use other measures of the bandwidth utilization such as an average over a fixed time window, a weighted average over a fixed time window, a peak usage measurement, or other measures or combinations of measures.

The moving average of the memory bandwidth utilization may then be compared to a first threshold MBT1 at decision block 415. If the moving average is below the first threshold, an operating point of the memory physical layer interface may be decreased at block 420. For example, an operating voltage and an operating frequency of the memory physical layer interface may be decreased to reduce the operating point of the memory physical layer interface. If the moving average is not below the first threshold, the moving average of the memory bandwidth utilization may be compared to a second threshold MBT2 at decision block 425. If the moving average is above the second threshold MBT2, the operating point of the memory physical layer interface may be increased at block 430. For example, the operating voltage and the operating frequency of the memory physical layer interface may be increased to increase the operating point of the memory physical layer interface. If the moving average is not above the second threshold MBT2, the operating point of the memory physical layer interface may remain unchanged and the memory bandwidth utilization in a subsequent time interval may be measured at block 405.

Some embodiments of the techniques described herein may have a number of advantages over the conventional practice. For example, modifying the operating point of the memory physical layer interface based upon the bandwidth utilization may result in reduced power consumption (in the controller, as well as memory modules in some embodiments) for several compute-intensive scenarios. For battery life scenarios that may be important during DC operation, the reduce power consumption may translate to improved battery life. For performance scenarios, the reduced power consumption may translate to higher CPU/GPU performance within the given TDP budget.

In some embodiments, the apparatus and techniques described above are implemented in a system comprising one or more integrated circuit (IC) devices (also referred to as integrated circuit packages or microchips), such as the APU 100 described above with reference to FIGS. 1-4. Electronic design automation (EDA) and computer aided design (CAD) software tools may be used in the design and fabrication of these IC devices. These design tools typically are represented as one or more software programs. The one or more software programs comprise code executable by a computer system to manipulate the computer system to operate on code representative of circuitry of one or more IC devices so as to perform at least a portion of a process to design or adapt a manufacturing system to fabricate the circuitry. This code can include instructions, data, or a combination of instructions and data. The software instructions representing a design tool or fabrication tool typically are stored in a computer readable storage medium accessible to the computing system. Likewise, the code representative of one or more phases of the design or fabrication of an IC device may be stored in and accessed from the same computer readable storage medium or a different computer readable storage medium.

A computer readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

Figure 5:
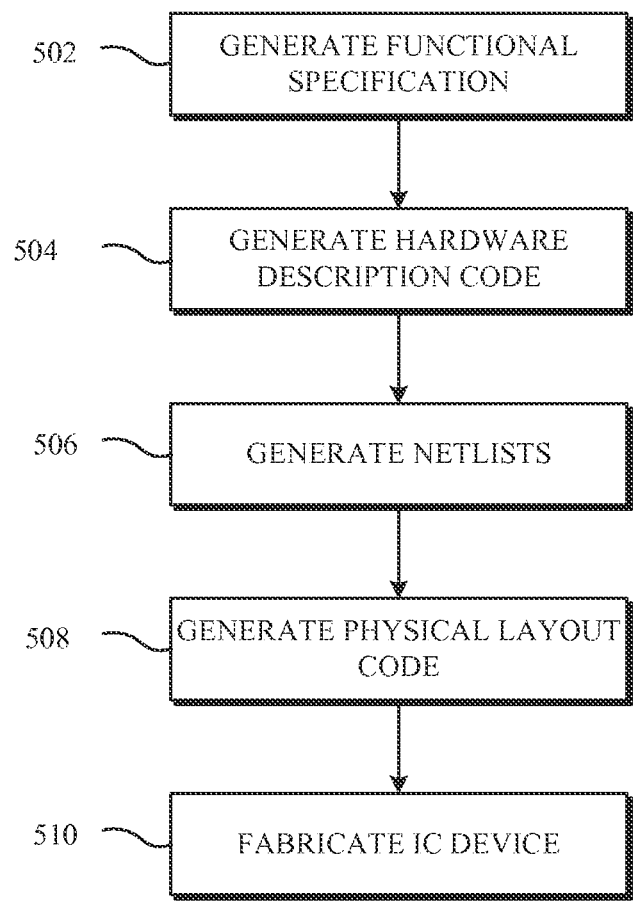
FIG. 5 is a flow diagram illustrating an example method for the design and fabrication of an IC device implementing one or more aspects in accordance with some embodiments.

FIG. 5 is a flow diagram illustrating an example method 500 for the design and fabrication of an IC device implementing one or more aspects in accordance with some embodiments. As noted above, the code generated for each of the following processes is stored or otherwise embodied in non-transitory computer readable storage media for access and use by the corresponding design tool or fabrication tool.

At block 502 a functional specification for the IC device is generated. The functional specification (often referred to as a micro architecture specification (MAS)) may be represented by any of a variety of programming languages or modeling languages, including C, C++, SystemC, Simulink, or MATLAB.

At block 504, the functional specification is used to generate hardware description code representative of the hardware of the IC device. In some embodiments, the hardware description code is represented using at least one Hardware Description Language (HDL), which comprises any of a variety of computer languages, specification languages, or modeling languages for the formal description and design of the circuits of the IC device. The generated HDL code typically represents the operation of the circuits of the IC device, the design and organization of the circuits, and tests to verify correct operation of the IC device through simulation. Examples of HDL include Analog HDL (AHDL), Verilog HDL, System-Verilog HDL, and VHDL. For IC devices implementing synchronized digital circuits, the hardware descriptor code may include register transfer level (RTL) code to provide an abstract representation of the operations of the synchronous digital circuits. For other types of circuitry, the hardware descriptor code may include behavior-level code to provide an abstract representation of the circuitry's operation. The HDL model represented by the hardware description code typically is subjected to one or more rounds of simulation and debugging to pass design verification.

After verifying the design represented by the hardware description code, at block 506 a synthesis tool is used to synthesize the hardware description code to generate code representing or defining an initial physical implementation of the circuitry of the IC device. In some embodiments, the synthesis tool generates one or more netlists comprising circuit device instances (e.g., gates, transistors, resistors, capacitors, inductors, diodes, etc.) and the nets, or connections, between the circuit device instances. Alternatively, all or a portion of a netlist can be generated manually without the use of a synthesis tool. As with the hardware description code, the netlists may be subjected to one or more test and verification processes before a final set of one or more netlists is generated.

Alternatively, a schematic editor tool can be used to draft a schematic of circuitry of the IC device and a schematic capture tool then be used to capture the resulting circuit diagram and to generate one or more netlists (stored on a computer readable media) representing the components and connectivity of the circuit diagram. The captured circuit diagram may then be subjected to one or more rounds of simulation for testing and verification.

At block 508, one or more EDA tools use the netlists produced at block 506 to generate code representing the physical layout of the circuitry of the IC device. This process can include, for example, a placement tool using the netlists to determine or fix the location of each element of the circuitry of the IC device. Further, a routing tool builds on the placement process to add and route the wires needed to connect the circuit elements in accordance with the netlist(s). The resulting code represents a three-dimensional model of the IC device. The code may be represented in a database file format, such as, for example, the Graphic Database System II (GDSII) format. Data in this format typically represents geometric shapes, text labels, and other information about the circuit layout in hierarchical form.

At block 510, the physical layout code (e.g., GDSII code) is provided to a manufacturing facility, which uses the physical layout code to configure or otherwise adapt fabrication tools of the manufacturing facility (e.g., through mask works) to fabricate the IC device. That is, the physical layout code may be programmed into one or more computer systems, which may then control, in whole or part, the operation of the tools of the manufacturing facility or the manufacturing operations performed therein.

In some embodiments, certain aspects of the techniques described above may implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method, comprising:
modifying an operating point of at least one of a memory physical layer interface or a memory controller in response to changes in bandwidth utilization of the memory physical layer interface, wherein the memory physical layer interface and the memory controller share a power budget with at least one processing unit, and wherein the operating point of the at least one of the memory physical layer interface or the memory controller is modified independently of an operating point of the at least one processing unit.

2. The method of claim 1, wherein the bandwidth utilization is a moving average bandwidth utilization that is determined using a predetermined time constant and a plurality of bandwidth utilization measurements.

3. The method of claim 1, wherein the bandwidth utilization indicates a ratio of a number of clock cycles during which the memory controller associated with the memory physical layer interface is busy to a total number of clock cycles.

4. The method of claim 1, wherein modifying the operating point comprises modifying at least one of an operating frequency or an operating voltage of said at least one of the memory physical layer interface or the memory controller.

5. The method of claim 4, further comprising:
comparing the bandwidth utilization of the memory physical layer interface to a first threshold; and
reducing the operating frequency and the operating voltage of said at least one of the memory physical layer interface or the memory controller if the bandwidth utilization of the memory physical layer interface is less than the first threshold.

6. The method of claim 5, further comprising:
comparing the bandwidth utilization of the memory physical layer interface to a second threshold that is larger than the first threshold; and
increasing the operating frequency and the operating voltage of said at least one of the memory physical layer interface or the memory controller if the bandwidth utilization of the memory physical layer interface is greater than the second threshold.

7. The method of claim 6, further comprising:
setting at least one of the first threshold or the second threshold based on at least one of a power usage policy or power usage mode.

8. The method of claim 7, wherein setting the first threshold or the second threshold based on the power usage mode comprises setting at least one of the first threshold or the second threshold to a relatively high value to conserve power during a direct current (DC) power usage mode in which the at least one processing unit operates on DC power.

9. The method of claim 7, further comprising:
allowing the at least one processing unit to consume additional power in response to reducing at least one of the operating frequency or the operating voltage of said at least one of the memory physical layer interface or the memory controller during an alternating current (AC) power usage mode in which the processing device operates on AC power.

10. The method of claim 1, wherein modifying the operating point of said at least one of the memory physical layer interface or the memory controller comprises modifying the operating point of said at least one of the memory physical layer interface or the memory controller based on at least one of a number of open pages, a number of page requests, or a number of bank requests.

11. An apparatus, comprising:
a memory controller;
a memory physical layer interface;
at least one processing unit that shares a lower budget with the memory controller and the memory physical layer interface; and
a power management controller to modify an operating point of at least one of the memory physical layer interface or the memory controller in response to changes in bandwidth utilization of the memory physical layer interface, wherein the operating point of the at least one of the memory physical layer interface or the memory controller is modified independently of an operating point of the at least one processing unit.

12. The apparatus of claim 11, wherein the power management controller is to determine a moving average bandwidth utilization using a predetermined time constant and a plurality of bandwidth utilization measurements.

13. The apparatus of claim 11, wherein the memory controller is to control access to a memory via the memory physical layer interface, wherein the power management controller is to determine a bandwidth utilization that indicates a ratio of a number of clock cycles during which the memory controller is busy to a total number of clock cycles.

14. The apparatus of claim 11, wherein the power management controller is to compare the bandwidth utilization to a first threshold and reduce the operating point by reducing at least one of an operating frequency or an operating voltage of said at least one of the memory physical layer interface or the memory controller if the bandwidth utilization is less than the first threshold.

15. The apparatus of claim 14, wherein the power management controller is to compare the bandwidth utilization to a second threshold that is larger than the first threshold and increase at least one of the operating frequency or the operating voltage of said at least one of the memory physical layer interface or the memory controller if the bandwidth utilization is greater than the second threshold.

16. The apparatus of claim 15, wherein the power management controller is to set at least one of the first threshold or the second threshold based on at least one of a power usage policy or power usage mode.

17. The apparatus of claim 16, wherein the power management controller is to set at least one of the first threshold or the second threshold to a relatively high value to conserve power during a direct current (DC) power usage mode in which the apparatus operates on DC power.

18. The apparatus of claim 16, wherein the power management controller is to allow said at least one processing unit to consume additional power in response to reducing the operating frequency and the operating voltage of said at least one of the memory physical layer interface or the memory controller during an alternating current (AC) power usage mode in which the apparatus operates on AC power.

19. The apparatus of claim 11, wherein the power management controller is to modify the operating point of said at least one of the memory physical layer interface or the memory controller based on at least one of a number of open pages, a number of page requests, or a number of bank requests.

20. A non-transitory computer readable medium embodying a set of executable instructions, the set of executable instructions to manipulate a computer system to perform a portion of a process to fabricate at least part of a processor, the processor comprising:

a memory controller;
a memory physical layer interface;
at least one processor that shares a power budget with the memory controller and the memory physical layer interface, and
a power management controller to modify an operating point of at least one of the memory physical layer interface or the memory controller in response to changes in bandwidth utilization of the memory physical layer interface, wherein the operating point of the at least one of the memory physical layer interface or the memory controller is modified independently of an operating point of the at least one processor.

* * * * *